Figure 1:
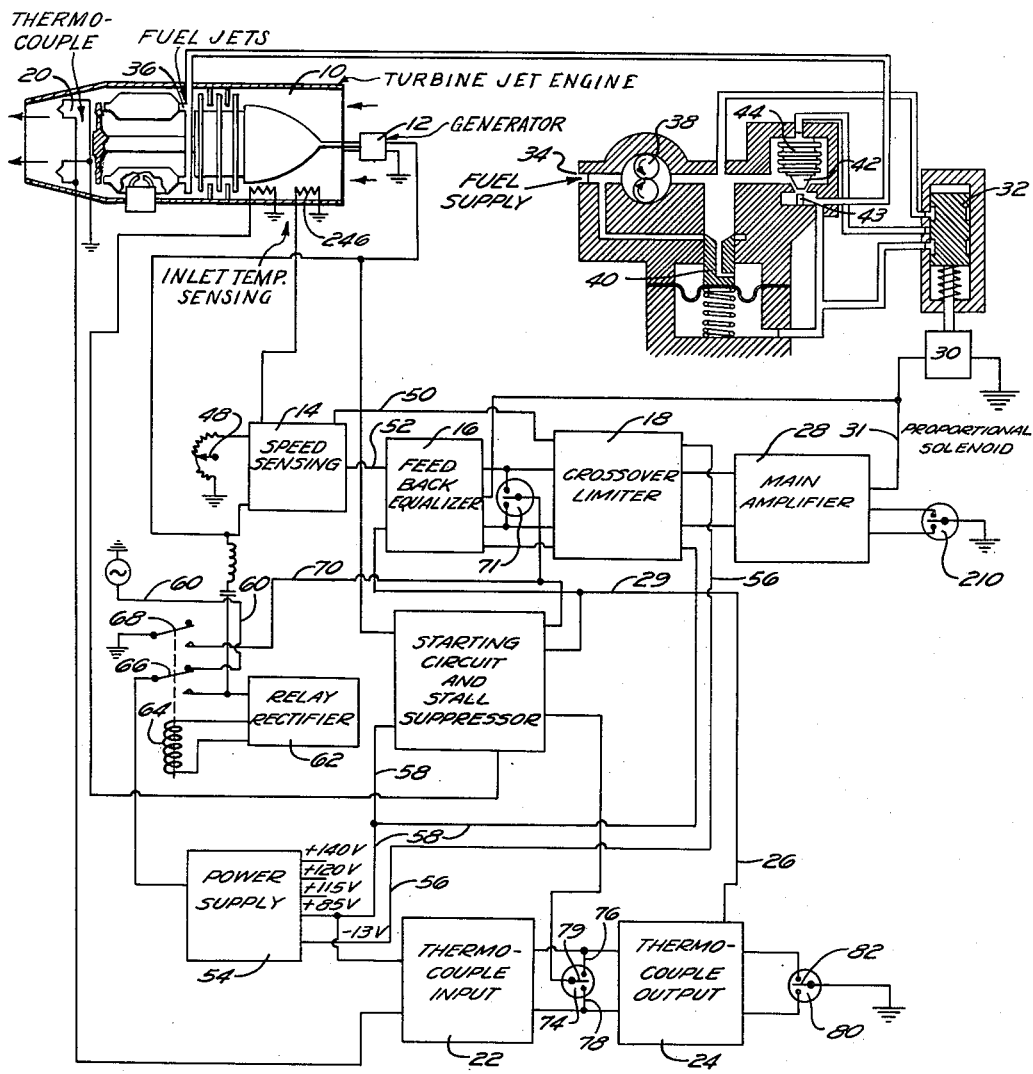

THOMAS P. FARKAS
INVENTOR
BY Harris G. Luther
ATTORNEY

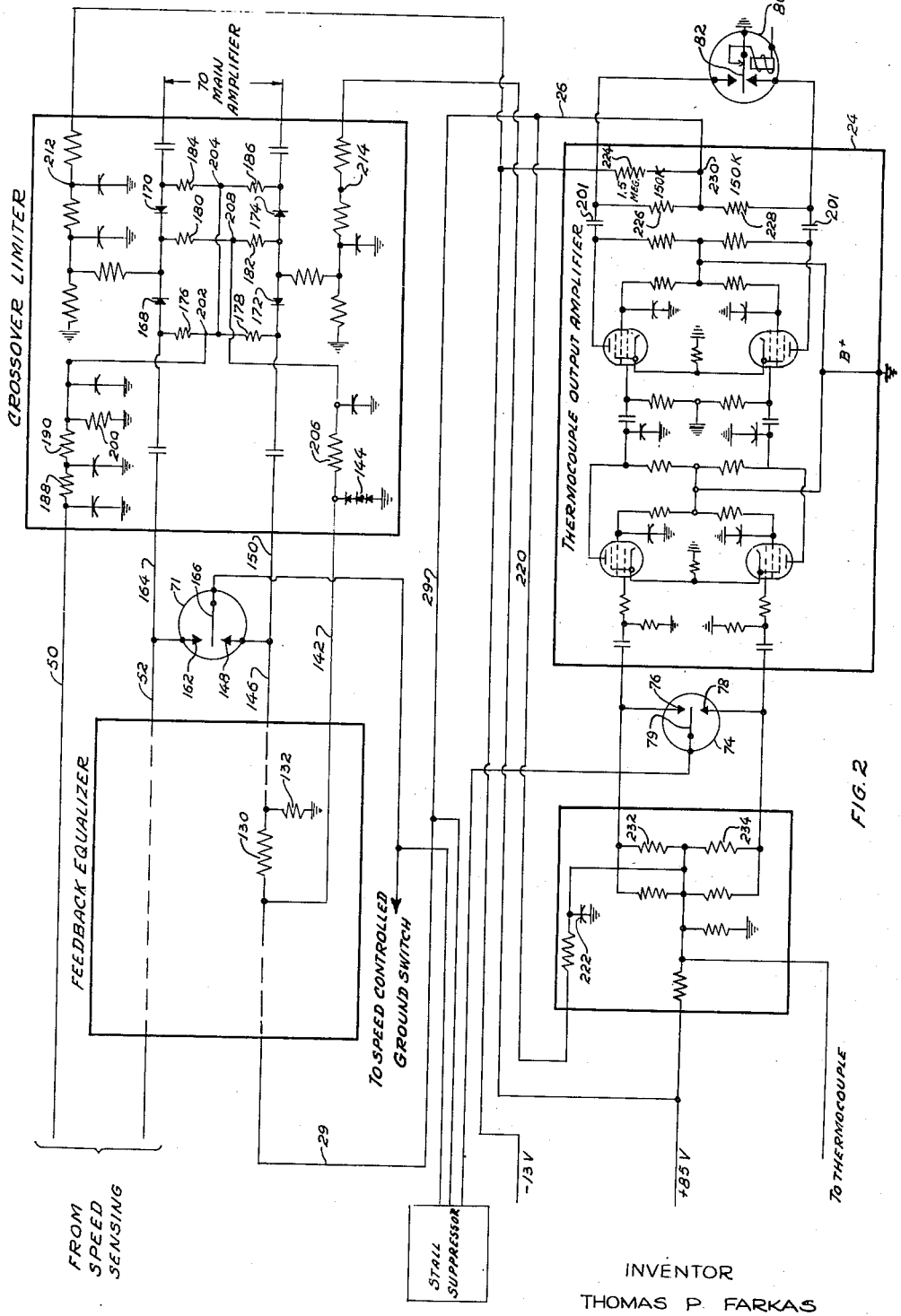

United States Patent Office 2,764,867
Patented Oct. 2, 1956

2,764,867
SAFETY CIRCUIT FOR THERMOCOUPLE UNIT OF THE JET FUEL CONTROL

Thomas P. Farkas, Bloomfield, Conn., assignor to United Aircraft Corporation, East Hartford, Conn., a corporation of Delaware Application December 6, 1952, Serial No. 324,569

11 Claims. (Cl. 60—39.28)

This invention relates to fuel control mechanism and particularly to safety means for continuing operation of said control after failure of one of its component parts.

An object of the invention is to provide a safety control signal upon failure of normal signal providing mechanism.

A further object is to provide an undertemperature signal upon failure of the temperature signal amplifier.

A still further object is mechanism which will permit control by speed responsive mechanism upon failure of the temperature responsive signal.

A still further object is mechanism which will permit an increase of fuel flow for underspeed conditions when the temperature responsive signal is disabled.

Still another object is the provision of means, in a fuel control that normally controls fuel flow in response to speed and temperature, for controlling fuel flow in response to speed alone upon failure of the temperature signal amplifier mechanism.

Additional objects and advantages will be apparent from the attached specification, claims and drawings in which, Fig. 1 is a schematic and block diagram showing the general arrangement of the turbine, the fuel supply and the electronic control for the fuel supply.

Fig. 2 shows the thermocouple output amplifier including the feedback to the thermocouple input circuit and the crossover limiter schematically in more detail than Fig. 1 including the wiring diagrams therefor.

Referring to the drawings and particularly to Fig. 1, the turbine jet engine 10 may be of any well known type such as the type utilizing a compressor receiving air from an air inlet and delivering the air under pressure to a combustion chamber where fuel is burned. The products of combustion from the combustion chamber are fed to a gas turbine which drives the compressor. Gas exhausted from the turbine passes out through a tailpipe. The compressor may be either centrifugal or axial flow type and the turbine may be either a power jet type or a portion of the turbine power may be utilized to drive a propeller giving a combination known as a turbo-prop.

During operation of the turbo-jet type in particular, the fuel is selectively controlled by a speed or a temperature sensitive control system. A speed is selected by the pilot on a speed control 48 which will select a datum for the speed sensitive control system. The signal from the speed sensitive control system is compared with a signal from the temperature sensitive control system in the crossover limiter and the resultant signal is used to position the pilot valve controlling the flow of fuel to the turbine. Thus control of the throttle is effected by movement of the speed control lever 48.

This control is electronic in nature and in general is similar to that shown in Offner application Serial No. 84,696, filed March 31, 1949, entitled System of Engine Speed Control. As shown in Fig. 1, of the present application, a speed signal is taken from a generator 12, which may be an alternating current generator driven by the turbine, and is fed to a speed sensing circuit 14. In the speed sensing circuit, a speed error voltage is produced. This error voltage may be zero when the turbine is onspeed, positive when the turbine is overspeed, and negative when the turbine is underspeed. The speed error signal is fed to crossover limiter 18.

A temperature signal is fed from tailpipe thermocouples 20 to thermocouple input circuit 22 where it is compared with a fixed voltage and transformed into a temperature error signal. The temperature error signal is amplified in the thermocouple outlet circuit 24 and fed through line 26 to feedback equalizer 16 and crossover limiter 18. The amplified temperature error signal is zero or null when ontemperature, positive when the turbine is overtemperature and negative when the turbine is undertemperature. In the crossover limiter 18, the most positive or least negative signal of the speed and temperature signals is selected to be transmitted to the main amplifier 28 where it is amplified and then fed to the proportional solenoid 30 through the line 31.

The proportional solenoid is of a type shown in Patent No. 2,579,723 issued December 25, 1951 to S. G. Best for Magnetic Device, to which reference may be made for a more detailed explanation. The proportional solenoid 30, which is normally centered or biased slightly in the fuel reducing direction but may be moved in one direction with a negative signal and in the opposite direction with a positive signal, operates a valve 32 controlling the flow of fuel from the fuel supply 34 to the fuel jets 36. This fuel supply system is of the type shown in application Serial No. 231,926, filed June 16, 1951, by D. R. Pearl and S. G. Best, for Fuel Control System for Turbine Engine, to which reference may be made for more detailed explanation and generally includes a fuel pump 38 for supplying fuel under pressure with a pressure actuated relief valve 40 for maintaining the pressure drop the same across the throttle valve 42. Valve 32 directs either the high or low pressure to the interior of bellows 44 to move valve 42 toward closed or opened position to thereby regulate the flow of fuel to the fuel jets 36. The movement of the valve toward closed position may be limited by a stop such as 43 to provide a minimum fuel flow.

The speed sensing circuit 14 utilizes a bridge circuit to match a constant voltage selected by the pilot's lever 48 against the voltage produced by a speed signal generator 12, the resulting signal is rectified to give a speed error signal which is applied to lines 50 and 52.

Power for operating the various electronic elements is normally provided by the generator 12 operating through a usual power supply 54, supplying among other voltages a minus 13 volt bias in line 56 and a plus 85 volt voltage-regulator-tube-controlled voltage in line 58. During the starting cycle, however, 400 cycle A. C. voltage from an outside source is supplied through the line 60 to the power supply. When a preselected speed is reached by the turbine and accordingly by the generator 12, the generator voltage acting through relay rectifier 62 and relay coil 64 will actuate switch arm 66 to disconnect the 400 cycle source and connect in the generator 12 to the power supply. A second switch arm 68 is actuated by the coil 64 at the same time in order to ground out line 70 to connect the swinger of chopper 71 to ground and disable the starting circuit after a preselected speed is reached. Reference may be had to application Serial No. 282,204, filed by S. G. Best and T. P. Farkas on April 15, 1952, for Starting Circuit for Electronic Jet Fuel Control, for further details of the starting circuit. The thermocouple output amplifier and the main amplifier are, in effect, D. C. chopper amplifiers of a well known type.

The thermocouple input and chopper 74 balance the thermocouple signal against a datum which may be fixed or may be varied as desired. The temperature signal may be compensated for thermocouple lag by a feedback circuit which will be described in more detail later.

The correction voltage or temperature error signal supplied by the thermocouple to the chopper contacts 76 and 78 is positive for an undertemperature condition and negative for an overtemperature condition. If a variable datum is used, a signal which is usually positive may be fed to the swinger 79 of chopper 74 to modify the amplitude of the square wave produced by the chopper 74. The swinger arm 82 of chopper 80 is mechanically synchronized with chopper arm 79 in such a way that positive signals at 76 and 78 will produce negative (i. e. undertemperature) voltage in the line 26 while negative voltages in the contacts 76 and 78 will produce positive (i. e. overtemperature) voltages in the line 26.

The convention observed with respect to the illustration of rectifiers herein is that current flow (from plus to minus) as distinct from electron flow is in the direction of the arrow.

The temperature error signal on line 26 is led through line 29 to resistors 130 and 132 to form a voltage divider circuit. A portion of the temperature error signal is led off through line 142 to the crossover limiter for switching purposes, which will be explained later. In the crossover limiter, rectifier 144 connects line 142 with ground and limits any negative temperature error voltage appearing on line 142 to a small amount, approximately one volt. A portion of the temperature error signal is led off from a point between resistors 130 and 132 through line 146 to contact 148 of the chopper 71 and is also led through line 150 into the crossover limiter from which it is selectively fed to the proportional solenoid in a manner to be described later.

The speed error signal is fed through line 52 to the contact 162 of chopper 71. This speed error signal is led on line 164 into the crossover limiter from which it is selectively fed to the proportional solenoid in a manner to be described later. The speed error signal, applied to line 50 from the speed sensing circuit, is fed into the crossover limiter for switching purposes which will be described later.

The speed and temperature error signals fed through lines 164 and 150 into the crossover limiter are led to rectifiers which will select one or the other as the signal to be transmitted to the main amplifier and thence to the proportional solenoid. The speed error signal on line 164 is a square wave and is led to rectifiers 168 and 170. The temperature error signal on line 150 is also a square wave and is led to rectifiers 172 and 174.

The speed error signal fed into the crossover limiter through line 50 is led through resistors 188 and 190, the condensers in the lines serving as filters. The speed error voltage existing between the resistors 190 and 200 is applied at 202 between resistors 176 and 178 and at 204 between resistors 184 and 186. This is a rectified DC error signal and is used to bias rectifiers 168, 170 and 174. In the same manner the DC temperature error signal is led in on line 142 and after passing through resistor 206 is applied at 208 between resistors 180 and 182 which are connected to the rectifiers 168, 170, 172 and 174 to bias them. It will now be apparent that if the voltage in the speed error signal at 202 and 204 is more positive than the voltage in the temperature error signal at 208, rectifiers 168 and 170 will be biased to conduction and rectifiers 172 and 174 will be biased to non-conduction. Rectifiers 168 and 170 being conductive will pass the speed error square wave produced by chopper 71 and fed in line 164 to the crossover limiter.

Conversely, if the temperature error signal fed into point 208 is more positive than the speed error signal fed into points 202 and 204, then rectifiers 172 and 174 will be biased to conduction and rectifiers 168 and 170 will be biased to non-conduction. The temperature error square wave fed in through line 150 will then be able to pass through rectifiers 172 and 174 to the proportional solenoid while the speed error signal becomes blocked. It is thus apparent that the most positive or the least negative error signal of the speed or temperature will select its corresponding square wave as the signal to be transmitted, amplified and fed to the proportional solenoid.

The network shown generally at 212 is fed from the minus 13 volt bias line of the power supply and is used to slightly bias rectifiers 168 and 170 to avoid the deadband common to all rectifiers. In a similar way the network shown generally at 214 is fed from the plus 85 volt section of the power supply to provide a bias for rectifiers 172 and 174 to avoid the deadband.

The speed and temperature error signals are arranged so that when fed to the crossover limiter an overspeed or overtemperature condition is indicated by a positive signal and conversely an undertemperature or underspeed signal is negative. In order to actuate the proportional solenoid 30 to close the throttle valve 42, it will therefore be necessary to feed a positive signal into the crossover limiter. This will call for less fuel in order to overcome an overspeed or overtemperature condition and thus close the valve. On the other hand, in order to actuate the proportional solenoid 30 so as to open the throttle valve 42, it will be necessary to feed two negative signals (i. e. both speed and temperature) into the crossover limiter. If one of the signals, say the temperature signal, is zero, i. e. neither positive or negative, and the other, speed, is negative, the proportional solenoid will not be actuated and hence the throttle valve will not be changed. In actual practice the proportional solenoid is slightly biased so that with zero signal, the valve actuated by the solenoid will be opened slightly toward throttle closing position, hence at zero signal the throttle will creep toward closed position and will eventually put the throttle into minimum flow position. This is a condition which would exist if the thermocouple amplifier should fail and the engine should arrive at an underspeed condition. It would then be impossible to increase the fuel flow so as to increase the speed because any actuation of the speed control lever to increase speed would just give a further underspeed indication and the zero signal from the temperature control would continue to govern, preventing any movement of the throttle valve. The invention of this application prevents such a condition from arising by providing mechanism which will automatically give an undertemperature indication upon failure of the thermocouple amplifier. As long as both signals are negative the proportional solenoid will be actuated to increase the fuel flow until one of them becomes zero or actually becomes positive and starts to reduce the fuel flow.

The thermocouple amplifier 24 is a resistance-capacitance coupled amplifier including the usual blocking or coupling condenser 201 and having four tubes connected in push-pull which may provide an overall gain as much as 5000. A feedback network is connected to output line 26 by line 220 and carries some of the output of the amplifier back to its input side. A network of this type has the property of compensating for a time lag elsewhere in the system. In this case it compensates for a time lag in the thermocouple. The thermocouples will not follow rapid temperature changes instantly but will lag somewhat. Hence if a temperature rise is being effected in the tailpipe, the thermocouple will start to produce an increased signal which will be fed to and amplified by the thermocouple amplifier and fed back as a negative feedback to the input but because of a condenser 222 the full effect of the feedback will not be immediately apparent, it being necessary to charge the condenser before the full increase in voltage can be fed back to the amplifier to again reduce the amplifier output. This time lag in the feedback will produce the effect of an increased temperature although the thermostat will not at that instant indicate such an increased temperature.

This same feedback circuit is utilized to provide a negative bias in the event of thermocouple amplifier failure. A connection from the minus 13 volt tap of the power supply is led through a comparatively large resistor 224 to the output line 26. This resistor which, for example, may be 1½ megohms, is led into the output circuit 26. The output circuit 26 is periodically grounded by chopper arm 82 through resistors 226 and 228 which may be 150 K. ohm resistors. The output line is also grounded through resistors 130 and 132 in the feedback equalizer, which resistors may be in the nature of 1 meg. total and there is also the source impedance of the thermocouple output amplifier so that the resistance from the junction 230 of the minus 13 volt line and the output line 26 to ground is so small that only a small portion of the minus 13 volts appears at the junction 230. When the amplifier is operating, the effective source impedance of the thermocouple amplifier is quite low because of the feedback through line 220 and resistors 232 and 234, which may be approximately 2 megohm resistors, to the input of the amplifier. This feedback is of such a nature that only about one-tenth of the normal output of the amplifier is maintained, the feedback cutting down the output by about 90 percent. This will provide an effective source impedance which is so low that approximately only one-tenth of a volt or less of the minus 13 volts will appear at junction 230 while the amplifier is operating. The effect of this small voltage is negligible and can be compensated for in the adjustment of the thermocouple.

If, however, the amplifier should fail either through malfunctioning or sticking of the vibrators 79, 82 or through failure of the amplifier tubes or some part of the network, the source impedance of the amplifier would be materially increased. If the vibrator 82 should happen to weld closed there would of course be a ground through resistors 226 or 228 and also through resistors 130 and 132. If the vibrator should stop in its normal position, there would be only the ground through the resistors 130 and 132. The actual source impedance of the amplifier would approach infinity and the feedback feature would become inoperative because there would be no square wave for the thermocouple output amplifier to amplify if the vibrator should fail and if the amplifier itself should fail, there would be no amplification and therefore no feedback. In the absence of the feedback, resistors 130 and 132 and possibly resistors 226 and 228 would act as substantially the sole impedance between junction 230 and ground so that a substantial portion of the minus 13 volts would appear on the output line 26. This portion would approach or exceed the 1 volt limit of the rectifier 144 and would thus provide a negative signal on the thermocouple input line 29, 142 and at the junction 208 in the crossover limiter. The rectifiers 168 and 170 would therefore for any normal speed condition be biased to conduction so that the speed signal on line 52 would be fed through the crossover limiter to the proportional solenoid and act as the controlling signal. In extreme underspeed conditions, the rectifiers 172 and 174 might be biased to conduction but the negative signal from the thermocouple amplifier would actuate the proportional solenoid to open the throttle and provide more fuel which in turn would increase the speed and return the control to the speed control circuit.

It will thus be apparent that I have provided a safety circuit for the thermocouple amplifier which will provide a negative (undertemperature) signal upon failure of the thermocouple amplifier or the choppers 74, 80.

Although only one embodiment of this invention has been illustrated and described herein, it will be apparent that various changes and modifications may be made in the arrangement of the various parts without departing from the scope of this novel concept.

For example, this invention has been explained by utilizing the algebraically greatest, i. e. the most positive or least negative, signal as the controlling one in the crossover circuit and by having overspeed and overtemperature signals as positive but it will be obvious that the connections can be made to utilize the algebraically least signal as the controlling signal and having overspeed and overtemperature signals as negative.

What it is desired to secure by Letters Patent is:

1. In a fuel control system having a first means having a source impedance and producing a signal responsive to the temperature of a selected engine portion, a second means for producing a signal upon failure of said first means comprising, a source of fixed voltage, a resistor connecting said source with the output of said first means, said first means including means increasing the effective source impedance of said first means upon failure of said first means whereby the effect of said fixed voltage on said output will be materially increased upon such failure.

2. In a fuel control system, a first means for producing a signal responsive to a variable and having a significant source impedance, safety means for providing a signal upon failure of said first means comprising a source of fixed voltage, a fixed impedance connecting said source with the output of said first means, said fixed impedance and said source impedance providing a voltage divider for said fixed voltage, said first means including means increasing the effective source impedance of said first means upon failure of said first means.

3. In a signal producing system, a first means for producing a positive or negative electrical signal responsive to variations of a selected variable in one direction or the other from a selected datum, an amplifier for said signal, a fixed bias, an impedance connecting said bias with the output of said amplifier, and a degenerative feedback from said output to the input of said amplifier, whereby the fixed bias will have substantially no effect on the output of the operating amplifier but will provide a substitute output of preselected polarity when the amplifier fails.

4. In a fuel control system for an engine, means for creating a signal responsive to engine speed, temperature responsive means, means connected with the temperature responsive means for creating an electrical signal in accordance with the temperature of said temperature responsive means, means comparing said electrical signal with a fixed datum for creating a null signal with said temperature at a selected value, and a signal of one polarity with said temperature above said selected value and of the opposite polarity with said temperature below said selected said selected value, an amplifier for the output of said comparing means, said amplifier including a negative feedback and providing a signal of fuel increasing polarity when said temperature is below said selected value, means comparing the output of said amplifier with said speed responsive signal including means for utilizing the algebraically predominant signal for controlling the fuel supply, means connecting a fixed bias of fuel increasing polarity to the output and the feedback of said amplifier, including an impedance which forms a voltage divider with the effective source impedance of said amplifier, to provide a relatively ineffective bias when the amplifier and feedback are functioning and an appreciable bias when the amplifier has failed and has a greater impedance to thereby permit the speed responsive signal to increase the fuel supply, when an underspeed condition exists.

5. In an engine fuel control system, fuel regulating mechanism, a first means having an output end and producing, at the output end of said means, an electrical signal responsive to an engine parameter, means connecting said first means with said mechanism for increasing or decreasing fuel in accordance with the polarity of said signal, safety means for automatically providing an electrical signal upon failure of said first means, comprising a source of fixed voltage of fuel increasing polarity, and means continuously connecting said source with the output end of said first means.

6. In an engine fuel control system having a first means having an output end and producing a signal, at the output end of said means, responsive to the temperature of a selected engine portion, a second means for producing a signal responsive to the engine speed and means connected with said first and second means for selecting the algebraically predominant signal for controlling the fuel, safety means for automatically supplying a signal upon failure of said first means, comprising a fixed fuel increasing bias continuously connected with the output end of said first means.

7. In combination with a signal amplifying device having an amplifier portion and an output portion and including a blocking condenser between the amplifier portion and the output portion, said amplifier providing signals of opposite polarity and having a degenerative feedback safety beans providing a signal of predetermined polarity upon failure of the amplifier comprising a source of voltage having the polarity of the signal desired upon failure of said amplifier, an impedance connecting said source with the output and the feedback circuit of said amplifier, said impedance being large compared with the effective source impedance of said amplifier, whereby when said amplifier fails and its effective impedance increases the voltage from said source will supply the safety signal.

8. In a fuel control device for an engine, means for producing a first electrical signal varying in accordance with one engine parameter, means for producing a second electrical signal varying in accordance with another engine parameter, means comparing the first signal and the second signal, and selecting the algebraically predominant signal for the fuel controlling signal, safety means for automatically supplying a signal upon failure of one of said signal producing means comprising an electrical signal source, an impedance continuously connecting said source with said one signal producing means, said signal producing means haveing a greater effective source impedance when failed than when operating, said operating impedance being materially smaller than said connecting impedance.

9. A device as in claim 8 in which the algebraically predominant signal is the one having the greatest effect on reducing fuel flow and the least effect on increasing fuel flow and in which the electrical signal source is of fuel increasing polarity.

10. A device as in claim 8 in which a negative fuel controlling signal will increase fuel flow and in which the algebraically predominant signal will be the most positive or least negative signal and in which the electrical signal source is negative.

11. A device as in claim 8 in which the one engine parameter is temperature and the other engine parameter is speed, and in which a fuel controlling signal of one polarity will increase fuel flow, of the opposite polarity will decrease fuel flow and of zero potential will have substantially no effect on fuel flow, and in which the algebraically predominant signal will be the one having the greatest effect on reducing fuel flow and the least effect on increasing fuel flow, and in which the electrical signal source is of fuel increasing polarity.

References Cited in the file of this patent

UNITED STATES PATENTS

| | | |
|---|---|---|
| 2,628,268 | Kerns | Feb. 10, 1953 |
| 2,648,194 | Jorgensen et al. | Aug. 11, 1953 |